United States Patent
Moolanmoozha et al.

(10) Patent No.: US 10,558,598 B2
(45) Date of Patent: Feb. 11, 2020

(54) LOGIC CIRCUIT THAT PROVIDES VERIFICATION OF SIGNALS USED TO INTERRUPT SERVER OPERATION

(71) Applicant: Seagate Technology LLC, Cupertino, CA (US)

(72) Inventors: Joe Paul Moolanmoozha, Bangalore (IN); Shailendra Singh Chauhan, Bangalore (IN); Manish Sharma, Bangalore (IN)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/925,956

(22) Filed: Mar. 20, 2018

(65) Prior Publication Data

US 2019/0294569 A1   Sep. 26, 2019

(51) Int. Cl.
*G06F 13/24* (2006.01)
*G06F 13/16* (2006.01)

(52) U.S. Cl.
CPC .......... *G06F 13/24* (2013.01); *G06F 13/1684* (2013.01); *G06F 2213/0016* (2013.01); *G06F 2213/24* (2013.01)

(58) Field of Classification Search
CPC ................. G06F 13/24; G06F 13/1684; G06F 2213/0016; G06F 2213/24
USPC ........................... 710/15, 20, 33, 36, 48, 260
See application file for complete search history.

(56) References Cited

U.S. PATENT DOCUMENTS

| | | | | |
|---|---|---|---|---|
| 4,967,342 A * | 10/1990 | Lent | ...................... | G06F 9/4843 710/268 |
| 5,257,367 A | 10/1993 | Goodlander et al. | | |
| 5,619,471 A * | 4/1997 | Nunziata | ............. | G06F 12/0607 365/230.03 |
| 5,720,028 A * | 2/1998 | Matsumoto | ........... | G06F 3/0601 714/5.11 |
| 5,740,183 A * | 4/1998 | Lowe | .................. | G06F 17/5022 714/25 |
| 6,085,333 A * | 7/2000 | DeKoning | ............... | G05B 9/03 714/6.32 |
| 6,804,742 B1 * | 10/2004 | Kitamura | .............. | G06F 11/364 710/312 |
| 6,915,363 B2 | 7/2005 | Wood et al. | | |
| 7,134,011 B2 | 11/2006 | Fung | | |
| 7,484,111 B2 | 1/2009 | Fung | | |
| 7,904,653 B2 * | 3/2011 | Chen | ................... | G06F 11/2089 711/114 |
| 2005/0228943 A1 * | 10/2005 | DeCenzo | ............ | G06F 11/1076 711/114 |
| 2008/0228896 A1 * | 9/2008 | Krig | ...................... | G06F 13/385 709/212 |

(Continued)

Primary Examiner — Farley Abad
Assistant Examiner — Henry W Yu
(74) Attorney, Agent, or Firm — Mueting, Raasch & Gebhardt, P.A.

(57) ABSTRACT

Based on a command to interrupt operation of a selected one or more of a plurality of data storage drives coupled to two or more storage controllers, two or more signals are sent from the two or more storage controllers via two or more data busses associated with and coupled to the respective two or more controllers. The selected data storage drive receives the two or more signals via the two or more data busses. Based on determining that the two or more signals agree, the operation of the selected drive is interrupted.

20 Claims, 5 Drawing Sheets

(56) References Cited

U.S. PATENT DOCUMENTS

2012/0011326 A1* 1/2012 Higashijima ....... G06F 12/0804
711/142

* cited by examiner

| Power Enable Controller 0 | Power Enable Controller 1 | Drive Power State | Remark |
|---|---|---|---|
| 0 | 0 | OFF | OFF State |
| 0 | 1 | ON | Transition or Error |
| 1 | 0 | ON | Transition or Error |
| 1 | 1 | ON | ON State |

*FIG. 2A*

| Power Enable Controller 0 | Power Enable Controller 1 | Drive Power State | Remark |
|---|---|---|---|
| 1 | 1 | OFF | OFF State |
| 0 | 1 | ON | Transition or Error |
| 1 | 0 | ON | Transition or Error |
| 0 | 0 | ON | ON State |

*FIG. 2B*

LOGIC CIRCUIT THAT PROVIDES VERIFICATION OF SIGNALS USED TO INTERRUPT SERVER OPERATION

SUMMARY

The present disclosure is directed to control of server apparatuses and systems. In one embodiment, two or more storage controllers provide redundant control of a plurality of data storage drives. Two or more serial data busses are associated with and coupled to the respective two or more controllers. The two or more controllers are operable to independently send signals to the plurality of data storage drives via the respective two or more data busses. The signals result in an interruption of operation of a selected one or more of the data storage drives. A plurality of logic circuits are each associated with and coupled to the respective data storage drives. Each of the logic circuits are coupled to the two or more data busses and are configured, in response to receiving the signal, send the signal to the selected data storage drives if the signals received via all of the two or more serial data busses agree.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 2A and 2B are truth tables used by logic circuits to change drive states according to example embodiments;

DETAILED DESCRIPTION

The present disclosure relates to large-scale server systems, e.g., storage servers. In enterprise-class storage server with high availability, a failure in one of the storage controllers should not cause any of the critical resources (such as the drives) to be made unavailable. To achieve the high availability, the control path may be shared between two controllers. Serial buses can be used as such a control path to optimize the back-plane connector pin count. However, some serial buses without intrinsic error detection mechanisms can cause misbehavior in high availability systems. Due to these limitations, there may be concerns with using serial communication buses such as those using the Inter-Integrated Circuit (I2C) protocol.

In high-availability systems, separate signals per critical device (e.g., per drive) originating from redundant controllers may be used to control the devices, which already consume a significantly number pins on interface connectors. There may be a practical limit on the amount of pins available on high-density storage server components such as back-planes or mid-planes used for a large number of storage devices using interfaces such as Non-Volatile Memory Extended (NVMe) and/or Serial Attached SCSI (SAS) storage devices. While a serial bus such as I2C can minimize the number of connections needed, these busses have no error correction or similar mechanism to ensure an erroneous signal does not cause a system interruption or failure. For example, if a drive is inadvertently powered down due to an erroneous signal, the system may need to restart or re-emulate the drives to keep critical resources online (or active), which may be an unacceptable interruption in a high-availability resource and therefore be considered a failure of the resource.

In embodiments described herein, methods and apparatuses employ additional qualification mechanisms to ensure the error-free control of the drives or other resources in a server. This allows using commercial off-the-shelf (COTS) low-pin-count communications devices to effect control of the devices. In one embodiment, a gated decision loop/circuit is used for effecting any change in the device state. This logical gating pre-qualifies the device turn-off commands through the approval of both the controllers. For systems implementing this feature, a single controller failure or erroneous signal sent during intentional servicing will not cause drives to unintentionally go down.

Figure 1:
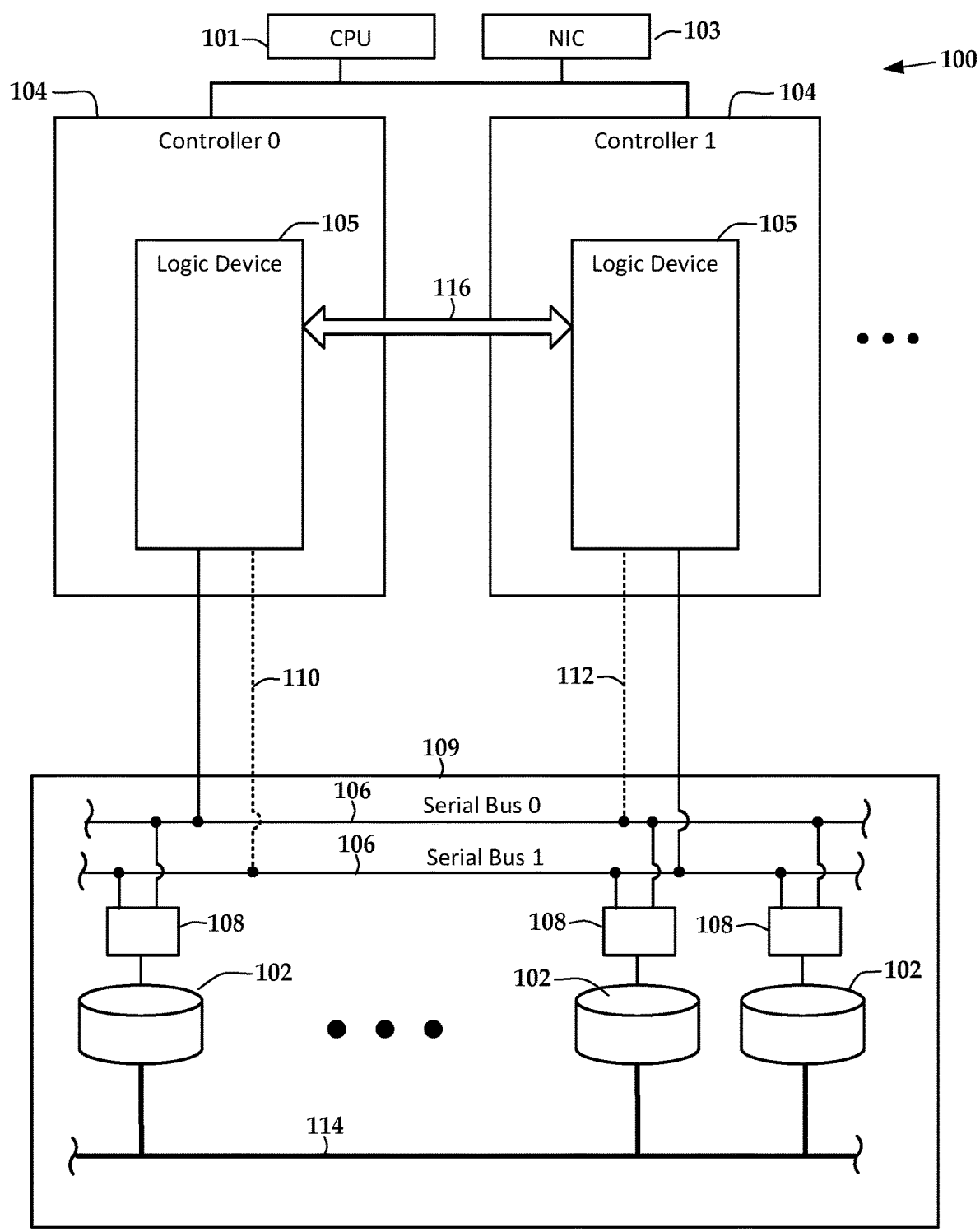
FIG. 1 is a block diagram of a server according to an example embodiment.

In FIG. 1, a block diagram shows a system 100 according to an example embodiment. The system 100 is configured as a storage server, and so includes a plurality of data storage drives 102. Generally, the data storage drives 102 represent a primary resource or service provided by the system 100. For other types of systems, other devices may be used in place of or in addition to the drives 102. For example, for a clustered computing system, processors and/or volatile memory may be included in the primary resources that are managed as described herein. For network switching/routing devices, network interfaces may be included in the managed primary resources.

The system includes two or more storage controllers 104 that provide redundant control of the plurality of data storage drives 102. In a storage application, the number of drives 102 may be significantly larger than the number of controllers 104. The controllers 104 may allow individual access to the drives 102 and/or present subsets of the drives 102 (or partitions thereof) as RAID volumes, for example. A system processor, e.g., one or more central processing units (CPUs) 101 may manage the controllers 104 and offer storage on the drives 102 as a local or network service, e.g., via network interface card (NIC) 103.

Each of the controllers 104 include respective logic devices 105 that are used for communicating via two or more serial data busses 106 associated with and coupled to the respective two or more controllers 104. The two or more controllers 104 are operable to independently send signals to the plurality of data storage drives 102 via the respective two or more data busses 106. The signals result in an interruption of operation of a selected one or more of the data storage drives. Each controller 104 may utilize a set of COTS serial-to-parallel convertors controlled by the logic device 105. The parallel bits from these convertors control the power and reset of individual drives 102.

A plurality of logic circuits 108 are each associated with and coupled to a respective one of the data storage drives 102. Each of the logic circuits 108 is coupled to the two or more data busses 106 and configured, in response to receiving the signal, send the signal to the selected data storage drives 102 if the signals received via all of the two or more serial data busses 106 agree. For example, the logic circuits 108 may include a logical OR gate that only sends a zero to the selected data storage drives 102 if the signals received via all of the two or serial data busses 106 are all zeros. The logic circuits 108 may be implanted in a circuit board 109 such as a mid-pane or back-plane, and/or may be attached to connectors/ports on the drives 102, or be integrated into the drives 102 themselves.

The data busses 106 may include any multiple-access type of bus, such as I2C, 1-Wire, Controller Area Network (CAN), etc. There will be at least one bus 106 for each controller 104. As indicated by dashed lines 110, 112, each of the controllers 104 may connect to all of the busses 106 in some scenarios. For example, if the system 100 supports a single controller mode, then one of the controllers 104 may drive all of the busses 106 so that the logic circuits 108 can operate without modification.

The system 100 may include other busses, as indicated by primary data transfer bus 114. This may include a high-speed bus such as SATA, NVM, PCI, etc., used for transfer of data between the storage drives 102 and CPU 101. The controllers 104 may also communicate with drives 102 via bus (or busses) 114, although generally this is used for application-specific communication, such as reading from and writing to the drives 102. Also shown is an inter-controller data bus 116 that may be used by the logic devices 105, e.g., in order to synchronize operations of the controllers 104, communicate state data of the controllers 104, etc. In this system 100, the inter-controller bus 116 communicates control bits from peer controller and also states of the logic circuits 108 between the logic devices 105.

The logic circuits 108 employ a state machine that controls power and reset of the storage drives via the serial busses 106 via a serial interface that may be implemented using an inexpensive COTS device that uses a small number of signal lines (e.g., I2C GPIO device). Gated decision loops within the logic circuits 108 validate any change in the device state and pre-qualify the device turn-off or turn-on commands through the approval of both the controllers 104. This minimizes the chance of error in control critical devices such as the drives 102 even if the serial busses 106 do not have intrinsic error detection mechanism.

Because a multiple-access serial bus utilizes minimal number of signal lines, pin count of peripheral-mounting circuit boards, such as mid-plane or back-plane, is reduced. For example, in All Flash Array (AFA) backplane connector, the scheme reduces pin count by ~140 pins compared to controlling the drives by individual I/O lines that are each dedicated to one of the drives. Reduced pin count improves thermal performance by increasing air flow opening in the peripheral mounting circuit boards. Reduced pin count also reduces overall system cost by allowing smaller pin count connectors on the peripheral mounting circuit boards and also eases routing of high speed signals in these circuit boards. The use of common serial line to communicate with the drives enables software and hardware compatibility between different density/capacity configurations for controlling the reset and power for drives.

As noted, the logic circuits may use an OR-gate (or decision loop with similar functionality) to cause a power off or reset of a selected data storage drive only if the signals received via all of the two or more serial data busses agree (all bits are 0). This ensures that erroneous setting of the control line by any one of the controllers will not turn off the drive. As shown in the truth table in FIG. 2A, any one of the controllers driving a bit incorrectly will not turn off the drive inadvertently. Though an error can cause the drive to be turned ON unintentionally, this does not affect the availability.

While some embodiments described herein are shown using a logical OR operation to determine if bits of two power/reset signals agree, similar functionality can be obtained using other logic circuits or algorithms. For example, FIG. 2B shows a truth table in which the bits received from two different controllers are logically ANDed together. Similar to the truth table in FIG. 2A, a difference in the bits from two controllers can cause the drive to be turned ON unintentionally, but the drive will only be turned off if both bits are set to 1. The truth tables in both FIGS. 2A and 2B can be extended to more than two controllers, as the logical operations shown in these tables can be extended to any number of bits as they are both commutative and associative. The truth tables in FIGS. 2A and 2B can be used for other commands such as for setting the state of a reset line. For example, a reset truth table could replace the OFF state with a RESET state in the tables of FIGS. 2A and/or 2B.

Figure 3:
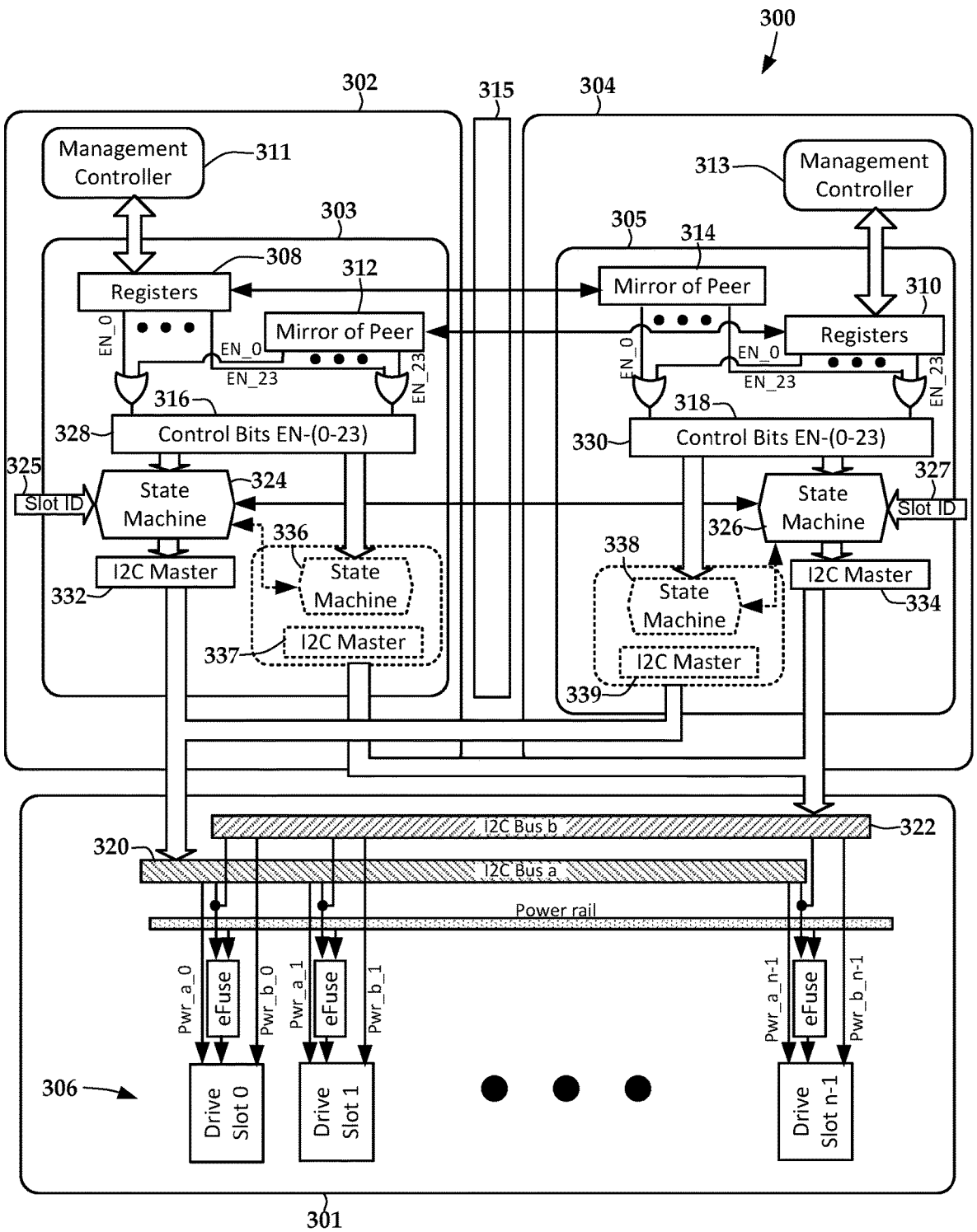
FIG. 3 is a block diagram of an apparatus according to an example embodiment.

In FIG. 3, a block diagram shows an example of operation of a dual-controller apparatus 300 according to an example embodiment. The apparatus 300 includes two storage controllers 302, 304 that control n-data storage drives 306, numbered from 0 to n−1. Generally, at least one of the storage controllers 302, 304 sends commands that, among other things, will interrupt operations of the storage drives 306, e.g., power off and/or reset. The commands may originate from one of the controllers 302, 304, from another processor one the server (e.g., central processing unit), or via a network from a remote management terminal. Based on the commands, the controllers 302, 304 form signals and deliver the signals to the drives 306 via a mid-plane drive board 301. It will be understood that the operations can be extended to more than two storage controllers (e.g., one master controller and two or more slave controllers), and features that allow utilize a single storage controller will also be discussed below.

The controllers 302, 304 include logic devices 303, 305 that control the enabling and disabling of the drives 306. The logic devices 303, 305 include status registers 308, 310 with a series of control bits, each bit controlling a power status of one of the drives. Note that there may be more than one bit associated with each drive, and the series of bits may have any order within the registers 308, 310. The logic devices 303, 305 also include respective mirrors 312, 314 of the other controller's registers 310, 308. The data of the mirrors 312, 314 are communicated via a trunk interface 315 which provides a mechanism for inter-controller communications. The trunk interface 315 may include shared memory, high-speed data bus, etc. The registers 308, 310 and mirrors 312, 314 also include a status bit that indicates idle or busy states of the respective logic devices 303, 305. A similar set of registers and mirrors may be used for other control signals, such as reset signals. These other signals may be written to data busses 320, 322, which in this example are shown as I2C busses.

Each controller 302, 304 includes a management controller 311, 313 that initiates writing data to the busses 320, 322 via state machines 324, 326. The state machines 324, 326 include interfaces that facilitate communicating with one another via the trunk interface 315. The state machines 324, 326 wait for idle state in the status bits of the registers 308, 310. One of the state machines 324, 326 is configured as a slave controller and the other as a master controller. For example, slot IDs 325, 327 input to state machines 324, 326 can be used to detect if state machines 324, 326 are master or slave. In this example, it is assumed state machine 324 (and thereby logic device 303 and management controller 311) is the master. If the status bits of the register 308 of the master logic device 303 are idle, the master management controller 311 can write the power and reset control bits (EN_0 to EN_23) corresponding to the drives 306 on to the register 308 in the logic device 303.

Writes from the master management controller 311 are buffered in the register 308 and are not passed immediately on the serial bus 320, which is susceptible to error. After writing to the register 308, the master logic device 303 then marks status bits in the register 308 as busy. A copy of the register 308 is passed on to the slave logic device 305 via the trunk interface 315 and the slave logic device 305 marks its status bits in register 310 as idle. The power/reset values (EN_0 to EN_23, each corresponding to at least one bit in the register) cached in register 308 are bitwise, logically combined (e.g., via OR gates as shown) with corresponding values in the mirror 312 to form the control bits 328 that will be written to a serial-to-parallel convertor that includes the state machine 324 and bus interface 332 (in this case an I2C master device). Note that if different bit values are used (e.g., as shown in FIG. 2B) to interrupt the drives, then different circuits or algorithms (e.g., AND gates) can be used for logically combining bits of the register 308 and mirror 312.

The master state machine 324 causes the control bits 328 to be written to bus 320 via the bus interface 332, and further reads back the written value to verify. If the verification fails, master state machine 324 retries a preconfigured number of times, after which "write timeout" is marked in the registers 308, after which the management controller 311 decides on further actions to be taken. If verification is successful, the master state machine 324 conveys the "write complete" to the slave state machine 326 via the trunk interface 315.

The slave state machine 326 waits for master state machine 324 to convey the "write complete" message. If the slave state machine 326 doesn't receive "write complete" from the master state machine 324 for a preconfigured timeout period, "write timeout" is marked in bits of its own register 310 and thereafter waits for actions from its own management controller 313. If, however, the slave state machine 326 timely receives "write complete" from the master state machine 324, it performs its own write to the other bus 322 via I2C master 334. A similar verification (including retries if failure is encountered) is performed by the slave state machine 326, and the master state machine 324 waits for "write complete" and "write timeout" being written to the register 310 in response to these actions. Once the master logic device 303 achieves "write complete" in its state machine 324 and also receives "write complete" from the slave state machine 326, it marks its status bits in the register 308 as idle. Thereafter, the drives 306 read messages targeted for their device ID on both busses 320, 322, and set the power state based on bits of the messages and the logic described herein, e.g., truth table in FIG. 2.

Note that logic devices 303, 305 include second state machines 336, 338 and second bus interfaces 336, 339. The second state machines 336, 338 that are coupled with the first state machines 324, 326 respectively (e.g., directly, via the trunk interface 315, or an emulation of the trunk interface 315). In the illustrated dual-controller configuration, these blocks 336, 338 are disabled as indicated by the dashed lines. However, in a single controller arrangement, the state machines 336, 338 and bus interfaces 337, 339 are activated to simulate a slave device that writes to one of the busses 320, 322 that is different than the bus written to by the master. For example, if storage controller 302 is used alone (deployed in the apparatus 300 without storage controller 304), the state machine 336 and bus interface act 337 act as a proxy for the storage controller 304, in particular acting as a proxy for the state machine 326 and bus interface 334. In this way, a single management controller can simulate dual controllers, and no modifications are needed for the drives 306 or the mid-plane board 301 to use a single controller versus multiple controllers.

Figure 4:
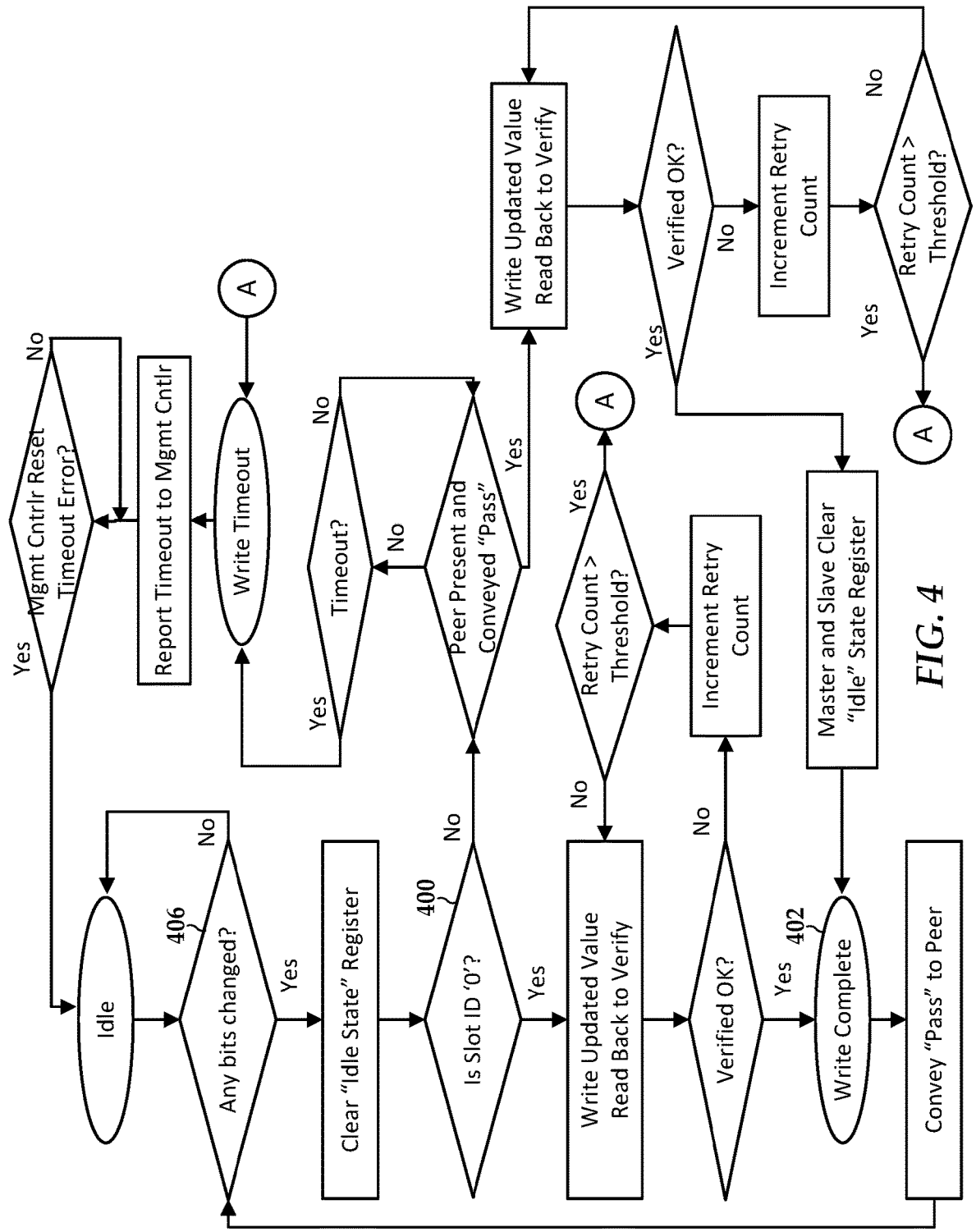
FIG. 4 is a flowchart showing operations of a state machine according to example embodiments.

In FIG. 4, a flowchart shows a procedure for setting device power states according to an example embodiment. Generally, this flowchart shows the procedure described above in relation to the state machines of apparatus shown in FIG. 3. Note that the master device in this example has slot ID of 0, so block 400 returns 'yes' if the device is a master device. Assuming the master device successfully writes and verifies the update value, the write complete state 402 is entered, and the conveyance of the pass to the peer at block 404 will trigger a change in block 406 for the slave device, which then takes the path where block 400 returns 'no.'

Figure 5:
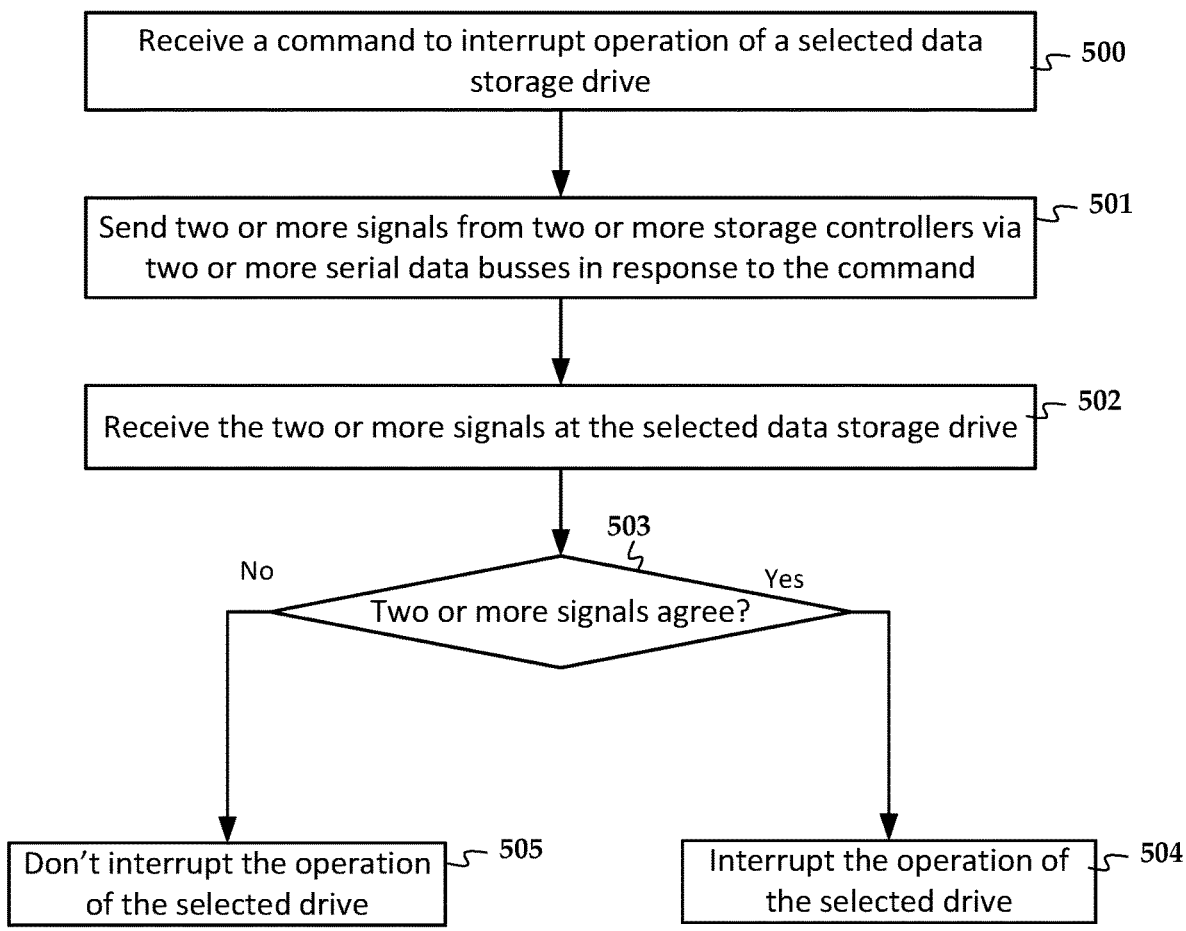
FIG. 5 is a flowchart of a method according to an example embodiment.

In FIG. 5, a flowchart shows a method according to an example embodiment. The method involves receiving 500 a command to interrupt operation of a selected one or more of a plurality of data storage drives coupled to two or more storage controllers. In response to the command, two or more signals are sent 501 from the two or more storage controllers via two or more serial data busses associated with and coupled to the respective two or more controllers. The two or more signals are received 502 at the selected data storage drive via the two or more serial data busses. Based on determining 503 that the two or more signals agree, the operation of the selected drive is interrupted 504. If the signals do not agree, the operation is not interrupted 505.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

What is claimed is:

1. An apparatus, comprising:
   a plurality of data storage drives;
   two or more storage controllers that are both coupled to the plurality of data storage drives via one or more primary data transfer busses and are configured to provide redundant control of the plurality of data storage drives;
   two or more multiple-access serial busses associated with and coupled to the respective two or more storage controllers, the two or more multiple access serial busses being separate from the one or more primary data transfer busses, the two or more storage controllers being operable to independently send signals to the plurality of data storage drives via the respective two or more multiple-access serial busses, the signals resulting in an interruption of operation of a selected one or more of the data storage drives; and
   a plurality of logic circuits each associated with and coupled to the respective data storage drives, each of the logic circuits being coupled to the two or more multiple-access serial busses and configured to, in response to receiving the signal, send the signal to the selected data storage drives if the signals received via all of the two or more multiple-access serial data busses agree.

2. The apparatus of claim 1, wherein the logic circuit comprises a logical OR that sends a zero to the selected data storage drives if the signals received via all of the two or more multiple-access serial data busses are all zeros.

3. The apparatus of claim 1, wherein the two or more multiple-access serial busses comprise I2C busses.

4. The apparatus of claim 1, wherein the interruption of the operation comprises one of a powering off or a reset of the selected data storage drive.

5. The apparatus of claim 1, wherein the two or more controllers each comprise respective logic devices, one of the logic devices configured as a master device and the others configured as slave devices, the logic devices coupled via an inter-controller bus.

6. The apparatus of claim 5, wherein the master device is configured to write and verify the signal written to one of the multiple-access serial busses and communicate a pass signal to the slave devices in response thereto, the slave devices configured to, in response to the pass signal, write and verify the signal written to another of the multiple-access serial busses.

7. The apparatus of claim 5, wherein the logic devices each comprise:
a register storing a series of bits each mapped to one of the data storage drives, the signals being based on the series of bits; and
a mirror of the registers of the others of the logic devices.

8. The apparatus of claim 7, wherein, for each of the logic devices, the bits of the register are logically combined with corresponding bits of the mirror before sending the signals to via the respective two or more multiple-access serial busses.

9. A method comprising:
based on a command to interrupt operation of a selected one or more of a plurality of data storage drives coupled to two or more storage controllers, sending two or more signals from the two or more storage controllers via two or more multiple-access serial busses associated with and coupled to the respective two or more storage controllers, the multiple-access serial busses being separate from one or more primary data transfer busses that couple the plurality of data storage drives to the two or more storage controllers;
receiving, at the selected data storage drive, the two or more signals via the two or more multiple-access serial busses; and
based on determining that the two or more signals agree, interrupting the operation of the selected drive.

10. The method of claim 9, wherein determining that the two or more signals agree comprises logically ORing two or more bits such that a zero is sent to the selected data storage drives if the signals received via all of the two or more multiple-access serial busses are all zeros.

11. The method of claim 9, wherein the two or more multiple-access serial busses comprise I2C busses.

12. The method of claim 9, wherein the interruption of the operation comprises one of a powering off or a reset of the selected data storage drive.

13. The method of claim 9, wherein the two or more controllers each comprise respective logic devices, one of the logic devices configured as a master device and the others configured as slave devices, the logic devices coupled via an inter-controller bus.

14. The method of claim 13, further comprising:
writing and verifying a first of the signals to one of the data busses via the master device; and
communicating a pass signal to the slave devices in response to the verifying;
writing and verifying a second of the signals to another of the multiple-access serial busses via one of the slave devices in response to the pass signal.

15. The method of claim 13, wherein the logic devices each comprise:
a register storing a series of bits each mapped to one of the data storage drives, the signals being based on the series of bits; and
a mirror of the registers of the others of the logic devices, wherein, for each of the logic devices, the bits of the register are logically combined with corresponding bits of the mirror before sending the signals to via the respective two or more multiple-access serial busses.

16. A storage controller, comprising:
one or more primary data transfer busses that couple the storage controller and a second storage controller with a plurality of data storage drives;
a first state machine with an interface operable to communicate with a corresponding state machine of a second storage controller;
a first serial bus interface operable to couple the first state machine to a first multiple-access serial bus, the first multiple-access serial bus coupled to a plurality of logic circuits each associated with and coupled to the respective plurality of data storage drives, each of the logic circuits further coupled to a second multiple-access serial bus that is coupled to the second storage controller, the first and second multiple-access serial busses being separate from the one or more primary data busses, the logic circuits configured to receive first and second signals from the storage controller and the second storage controller via the respective first and second multiple-access serial busses in response to coordination between the first state machine and the corresponding state machine, the logic circuits interrupting the operation of the respective drives if the first and second signals agree.

17. The storage controller of claim 16, further comprising a second state machine coupled to the first state machine and a second serial bus interface operable to couple the second state machine to the second bus, the second state machine and second serial bus interface configured to act as a proxy for the second storage controller when the storage controller is deployed in a storage server without the second storage controller.

18. The storage controller of claim 16, further comprising:
a register storing a first series of bits each mapped to one of the data storage drives, the first signals being based on the first series of bits; and
a mirror of a corresponding register of the second storage controller, the corresponding register comprising a second series of bits each mapped to one of the data storage drives, the second signals being based on the second series of bits, wherein individual bits of the first series of bits are logically combined with the corresponding bits of the second series of bits by the storage controller before sending the first signal via the first bus interface.

19. The storage controller of claim 16, wherein the first state machine is configured to write and verify the first signal to the first bus and communicate a pass signal to the corresponding state machine in response to the verifying, the corresponding state machine writing and verifying the second signal to the second bus in response to the pass signal.

20. The storage controller of claim 16, wherein the first and second multiple-access serial busses comprise I2C busses.

\* \* \* \* \*